United States Patent
Wakumoto et al.

(10) Patent No.: US 7,376,089 B2
(45) Date of Patent: May 20, 2008

(54) MULTIPLE-INSTANCE MESHING

(75) Inventors: Shaun Kazuo Wakumoto, Roseville, CA (US); Ballard Claude Bare, Auburn, CA (US); Cetin Ersoy, Portsmouth, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 834 days.

(21) Appl. No.: 10/812,261

(22) Filed: Mar. 29, 2004

(65) Prior Publication Data
US 2005/0213515 A1 Sep. 29, 2005

(51) Int. Cl.
H04L 12/28 (2006.01)
(52) U.S. Cl. ..................................... 370/254
(58) Field of Classification Search ........ 370/253–254, 370/535, 216, 400–404, 519, 242, 406, 410, 370/389, 235–237; 455/67, 446, 442; 716/20
See application file for complete search history.

(56) References Cited

U.S. PATENT DOCUMENTS

| | | | |
|---|---|---|---|
| 6,493,318 B1 | 12/2002 | Bare | |
| 6,577,600 B1 | 6/2003 | Bare | |
| 6,580,715 B1 | 6/2003 | Bare | |
| 7,085,241 B1 * | 8/2006 | O'Neill et al. | 370/254 |
| 7,111,073 B1 * | 9/2006 | Jain et al. | 709/241 |
| 2003/0117945 A1 | 6/2003 | Zboril | 370/216 |
| 2003/0174723 A1 * | 9/2003 | DeHon et al. | 370/404 |
| 2004/0190454 A1 * | 9/2004 | Higasiyama | 370/238 |
| 2005/0192037 A1 * | 9/2005 | Nanda et al. | 455/509 |
| 2005/0213513 A1 * | 9/2005 | Ngo et al. | 370/254 |

* cited by examiner

Primary Examiner—Wing Chan
Assistant Examiner—Prenell Jones

(57) ABSTRACT

One embodiment disclosed relates to a switching system. The switching system includes first, second, and third sets of switches. The first set of switches is configured with a first instance of meshing software such that the switches in the first set are members of a first mesh domain. The second set of switches is configured with a second instance of the meshing software such that the switches in the second set are members of a second mesh domain. The third set of switches is configured with both the first and second instances of the meshing software such that the switches in the third set are members of both the first and second mesh domains. Another embodiment disclosed relates to a packet switch apparatus executing multiple instances of meshing software. Another embodiment disclosed relates to a method of configuring a switching system having multiple mesh domains.

10 Claims, 7 Drawing Sheets

MULTIPLE-INSTANCE MESHING

BACKGROUND OF THE INVENTION

1. Field of the Invention

The present invention relates generally to communication networks. More specifically, the present invention relates to network switches and switch-to-switch protocols.

2. Description of the Background Art

It is common in conventional computing environments to connect a plurality of computing systems and devices through a communication medium often referred to as a network. Such networks among communicating devices permit devices (or users of devices) to easily exchange and share information among the various devices. The Internet is a presently popular example of such networking on a global scale. Individual users attach their computers to the Internet, thereby enabling sharing of vast quantities of data on other computers geographically dispersed throughout the world.

Networked computing systems may be configured and graphically depicted in a wide variety of common topologies. In other words, the particular configurations of network communication links (also referred to as paths) and devices between a particular pair of devices wishing to exchange information may be widely varied. Any particular connection between two computers attached to a network may be direct or may pass through a large number of intermediate devices in the network. In addition, there may be a plurality of alternative paths through the network connecting any two network devices. Computing networks are therefore complex and vary in their configurations and topologies.

Certain network communication media and protocols are referred to as packet oriented. A protocol or communication medium may be said to be packet oriented in that information to be exchanged over the network is broken into discrete sized packets of information. A block of information to be transferred over the network is decomposed into one or more packets for purposes of transmission over the network. At the receiving end of the network transmission, the packets are re-assembled into the original block of data.

In general, each packet includes embedded control and addressing information that identifies the source device which originated the transmission of the packet and which identifies the destination device to which the packet is transmitted. Identification of source and destination devices is by means of an address associated with each device. An address is an identifier which is unique within the particular computing network to identify each device associated with the network. Such addresses may be unique to only a particular network environment (i.e., a network used to interconnect a single, self-contained computing environment) or may be generated and assigned to devices so as to be globally unique in co-operation with networking standards organizations.

At the lowest level of network communication, such addresses are often referred to as MAC address (Media ACcess address). Network protocols operable above this lowest level of communication may use other addresses for other purposes in the higher-level communication techniques.

In many conventional commercially-available network environments, the network communication medium is in essence a bus commonly attached to a plurality of devices over which the devices exchange. In a simple networking topology, all devices may be attached to such a bus-structured common network medium. Any particular single network medium has a maximum data exchange bandwidth associated therewith. The maximum data exchange bandwidth of a medium is determined by a number of electrical and physical properties of the medium and protocols used to communicate over that medium. For example, a popular family of related network media and protocols are collectively referred to as Ethernet. Ethernet defines a standard protocol for the exchange of messages over the communication medium. A variety of communication media are also defined as part of the Ethernet family. The communication bandwidth of the Ethernet family of standards may change over time, but conventionally ranges from approximately 10 Mbit (megabits or million bits of information) per second to 1 Gbit (gigabits or billion bits of information) per second. Therefore, a single (slow) Ethernet connection, for example, has a maximum data exchange bandwidth of approximately 10 Mbit per second.

In conventional network computing environments, a number of devices are used in addition to interconnected computing systems to efficiently transfer data over the network. Routers and switches are in general network devices which segregate information flows over various segments of a computer network. A segment, as used herein, is any subset of the network computing environment including devices and their respective interconnecting communication links. As noted above, a single computer network communication link has a maximum data transfer bandwidth parameter defining the maximum rate of information exchange over that network. Where all devices on a computer network share a common network medium, the maximum bandwidth of the computer network may be rapidly reached. The overall performance of the networked computing environment may be thereby reduced because information exchange requests may have to await completion of earlier information exchange requests presently utilizing the communication link.

It is often the case, however, that particular subsets of devices attached to the network have requirements for voluminous communication among members of the same subset but less of a requirement for information exchange with other devices outside their own subset. Though standard switch features generally do not include identifying such logical groupings of devices, some enhanced switching features do permit such logic to be performed within a switch device. For example, some enhanced switch features include the concept of defining and routing information based on virtual LAN (VLAN) definitions. In a VLAN, a group of devices may be defined as logically being isolated on a separate network although physically they are connected to a larger network of devices. VLAN features of enhanced switches are capable of recognizing such VLAN information and can route information appropriately so that devices in a particular VLAN are logically segregated from devices outside the VLAN.

For example, the financial department of a large corporation may have significant information exchange requirements within the financial department but comparatively insignificant needs for data exchange with other departments. Likewise, an engineering group may have significant needs for data exchange within members (computing systems and devices) of the same engineering group but not outside the engineering group. There may in fact be multiple of such subsets of devices in a typical computing network. It is therefore desirable to segregate such subsets of devices from one another so as to reduce the volume of information exchange applied to the various segments of the computer network.

In particular, a switch device is a device that filters out packets on the network destined for devices outside a defined subset (segment) and forwards information directed between computing devices on different segments of a networked computing environment. The filtering and forwarding of such information is based on configuration information within the switch that describes the data packets to be filtered and forwarded in terms of source and/or destination address information (once address locations are "learned" by the switch(es)).

Network switch devices and protocols associated therewith are also used to manage redundant paths between network devices. Where there is but a single path connecting two network devices, that single path, including all intermediate devices between the source and destination devices, represent a single point of failure in network communications between that source and destination device. It is therefore common in network computing environments to utilize a plurality of redundant paths to enhance reliability of the network. Having multiple paths between two devices enhances reliability of network communication between the devices by allowing for a redundant (backup) network path to be used between two devices when a primary path fails.

SUMMARY

One embodiment disclosed relates to a switching system. The switching system includes first, second, and third sets of switches. The first set of switches is configured with a first instance of meshing software such that the switches in the first set are members of a first mesh domain. The second set of switches is configured with a second instance of the meshing software such that the switches in the second set are members of a second mesh domain. The third set of switches is configured with both the first and second instances of the meshing software such that the switches in the third set are members of both the first and second mesh domains.

Another embodiment disclosed relates to a packet switch apparatus. The apparatus includes at least multiple ports, a switch controller, and memory. The multiple ports are configured to receive and transmit data packets. The switch controller is coupled to the plurality of ports. The memory is coupled to the switch controller and configured to hold instructions and data for use by the controller. In particular, the memory holds multiple instances of meshing software that are executing on the apparatus.

Another embodiment disclosed relates to a method of providing multiple-instance meshing in a switching system. A mesh identifier is inserted into a meshing packet to identify which mesh instance is associated with the packet. The meshing packet is processed using an instance of meshing software corresponding to the mesh identifier.

DETAILED DESCRIPTION

Meshing software in a prior switching system restricts a switch to either be a member of a single mesh domain or not be a member of any mesh domain. The meshing software in the prior switching system also has a maximum number of switches that may be a member of a mesh domain. As a result, if a customer wishes to have a mesh that exceeds the maximum number of switches therein, this is accomplished by connecting multiple meshes together via trunk links (or other connecting means) and a version of the spanning tree protocol (STP). The version of STP may comprise, for example, IEEE 802.1d, IEEE 802.1w, or IEEE 802.1s. An example of such a system with multiple mesh domains is discussed below in reference to FIG. 1.

With the prior strict requirement that a switch can only be a member of one mesh domain, customers are often forced to build large mesh domains in order to fulfill port density requirements or to fulfill a need to span across a physically separated topology with many switches. Large mesh domains often stress switches to a limit of their capabilities because meshing is a feature that requires a large amount of resources. As more switches are added to a mesh domain, the required resources can grow exponentially.

The disclosure of the present application provides a solution that allows a customer to break down their large mesh domains into smaller, more reliable mesh domains in order to provide a more robust solution. The smaller mesh domains also advantageously result in smaller broadcast domains. This is accomplished by way of multiple-instance meshing.

Figure 1:
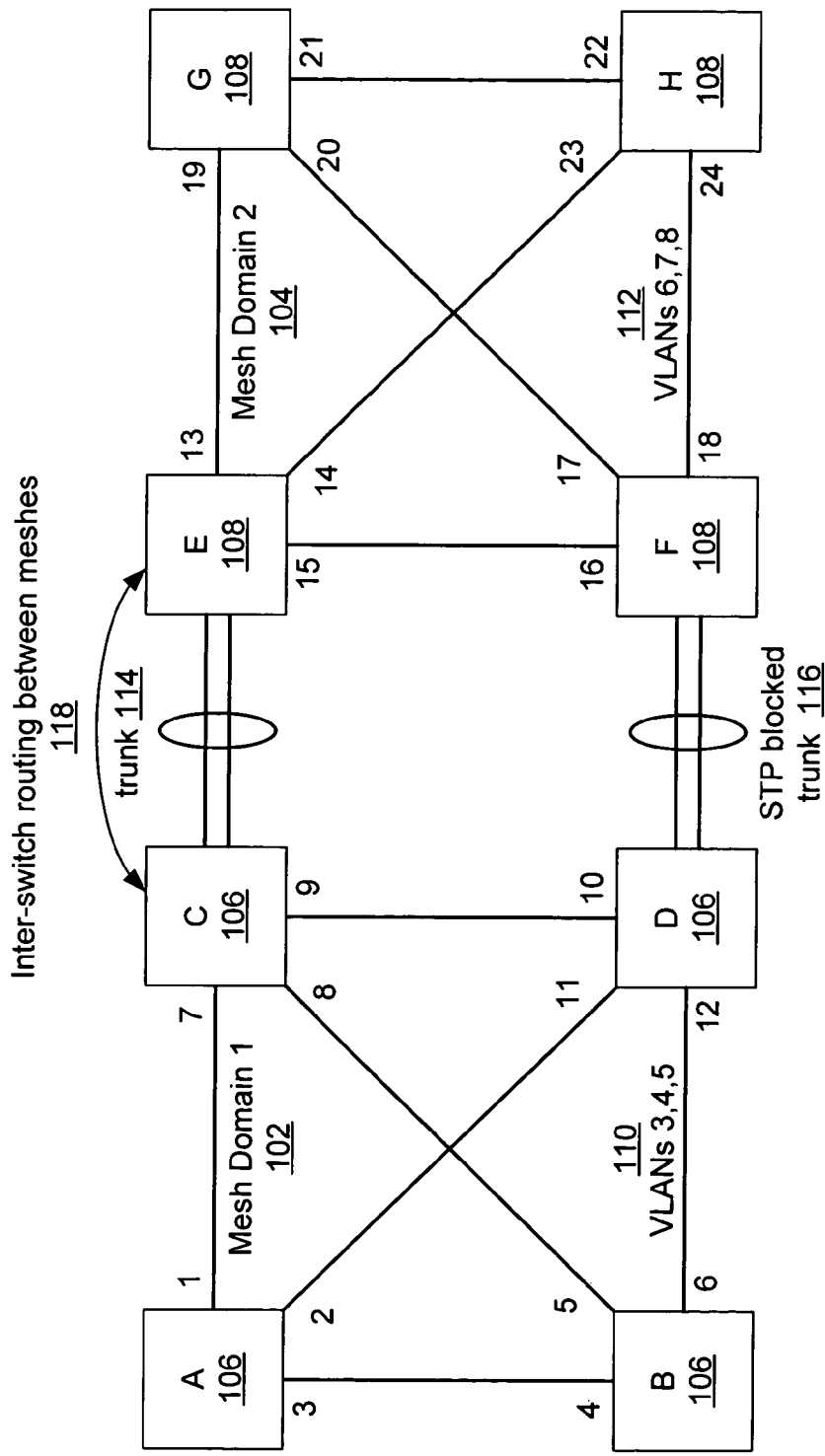
FIG. 1 is a schematic diagram depicting a prior switching system including a number of switches too large for a single mesh domain.

FIG. 1 is a schematic diagram depicting a prior switching system 100 including a number of switches too large for a single mesh domain. The system 100 includes a first mesh domain (Mesh Domain 1) 102 and a second mesh domain (Mesh Domain 2) 104. The first mesh domain 102 includes several member switches 106, and the second mesh domain 104 also includes several member switches 108. The mesh domains do not overlap. In other words, no switch is a member of both domains.

Non-mesh ports of switches 106 in the first mesh domain 102 may belong to one or more virtual local area networks (VLANs) from a first group of VLANs 110. Non-mesh ports of switches 108 in the second mesh domain 104 may belong to one or more VLANs from a second group of VLANs 112.

Trunk links (or other connecting means) 114 and 116 connect the first and second mesh domains. Each trunk link connects a switch 106 from the first mesh domain 102 with a switch 108 from the second mesh domain 104. Network loops are prevented by a version of STP blocking a selected trunk or selected trunks. For purposes of illustration, the trunk link 116 connecting switch D in Mesh Domain 1 to switch F in Mesh Domain 2 is shown as STP blocked in FIG. 1. An STP blocked trunk is not active. Packets needing to travel between mesh domains are routed 118 across the active trunk link between a switch in the first domain and a switch in the second domain.

Figure 2:
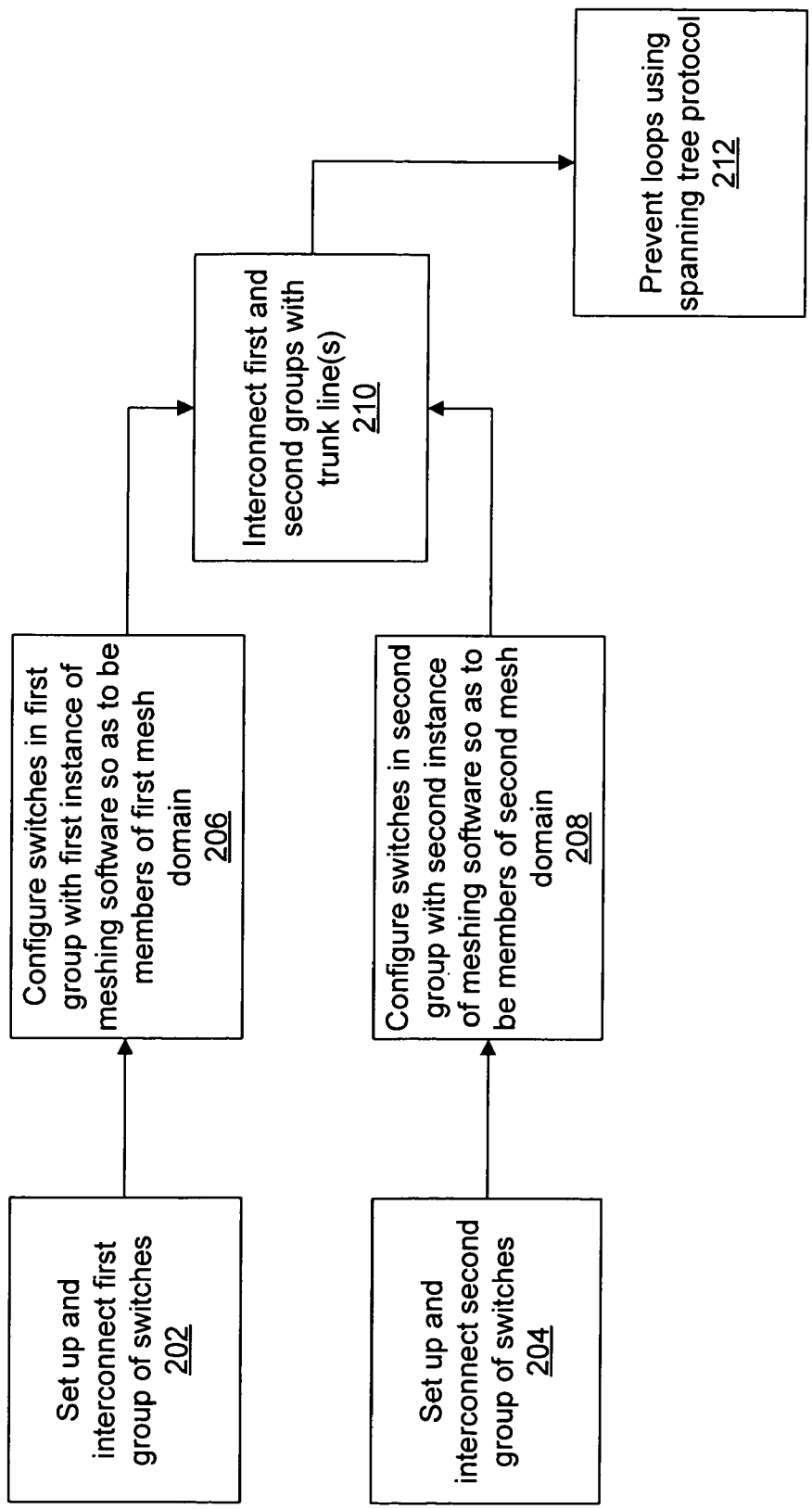
FIG. 2 is a chart depicting some steps in configuring a prior switching system.

FIG. 2 is a chart depicting some steps in configuring the prior switching system. In this example, the prior switching system being configured includes two separate mesh domains, such as the system 100 discussed above in reference to FIG. 1.

The steps include setting up and interconnecting 202 a first group of switches for the first mesh domain, and setting up and interconnecting 204 a second group of switches for the second mesh domain. There is no overlap between the first and second groups as there is no overlap between the first and second mesh domains.

The switches in the first group are configured 206 with a first instance of the meshing software so that each of these switches becomes a member of the first mesh domain. The switches in the second group are configured 208 with a second instance of the meshing software so that each of these switches becomes a member of the second mesh domain.

One or more trunk links (or other connecting means) are used to interconnect 210 the first and second groups of switches. Finally, to prevent loops in the network topology, spanning tree protocol is used and blocks selected trunk links (making them inactive).

As discussed above, the prior switching system includes meshing as an on or off feature in that a mesh switch can only be part of one mesh. Applicants have determined that this is disadvantageously restrictive in an environment that requires multiple networks. The restriction that a mesh switch can only be part of one mesh prevents full utilization of the advantageous capabilities of meshing, including fault tolerance, redundancy, and load balancing.

Figure 3:
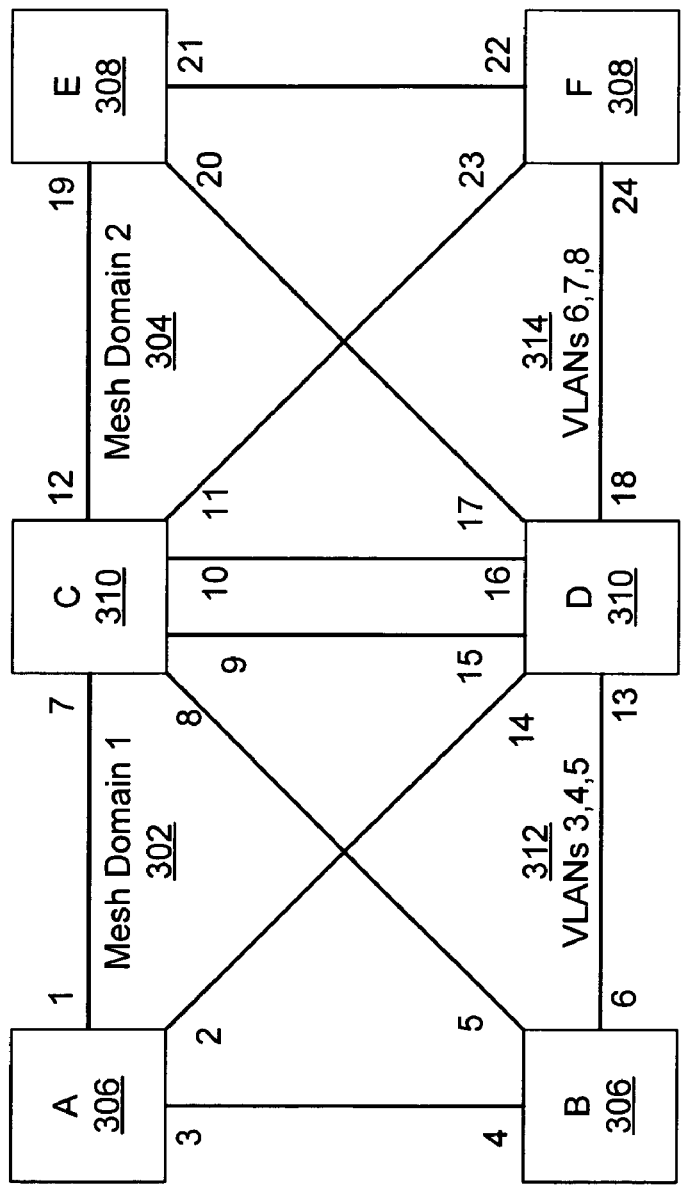
FIG. 3 is a schematic diagram depicting an exemplary switching system including multiple-instance meshing in accordance with an embodiment of the invention.

FIG. 3 is a schematic diagram depicting an exemplary switching system 300 including multiple-instance meshing in accordance with an embodiment of the invention. The switching system 300 shown in FIG. 3 includes two mesh domains 302 and 304. However, the system 300 may be expanded to include more than two mesh domains in similar fashion.

A first set of switches 306 are configured with a first instance of the meshing software such that they are only members of the first mesh domain (Mesh Domain 1) 302. In other words, mesh ports of the first set of switches 306 belong to the first mesh domain 302. Non-mesh ports (not illustrated) of the first set of switches 306 may belong to one or more VLANs from a first group of VLANs 312.

A second set of switches 308 are configured with a second instance of the meshing software such that they are only members of the second mesh domain (Mesh Domain 2) 304. In other words, mesh ports of the second set of switches 308 belong to the second mesh domain 304. Non-mesh ports (not illustrated) of the second set of switches 308 may belong to one or more VLANs from a second group of VLANs 314.

A third set of switches 310 are configured with both the first and second instances of the meshing software such that they are members of both the first 302 and second 304 mesh domains. In the diagram of FIG. 3, switches C and D are in the third set of switches and so are a part of the two different mesh domains. In order for this to be accomplished, switches C and D are each configured to have separate instances of the mesh software running on the switch's embedded operating system. Mesh ports of the third set of switches 310 belong to either the first mesh domain 302 or the second mesh domain 304. As an example, for switch C in FIG. 3, ports 7, 8, and 9 are members of Mesh Domain 1, and ports 10, 11, and 12 are members of Mesh Domain 2. As another example, for switch D in FIG. 3, ports 13, 14, and 15 are members of Mesh Domain 1, and ports 16, 17, and 18 are members of Mesh Domain 2. Non-mesh ports (not illustrated) of the third set of switches 310 may belong to one or more VLANs from the first and/or second groups of VLANs.

Each of the third set of switches 310 is interconnected to at least one switch from the first set of switches 306 and at least one switch from the second set of switches 308. This is because each of the third set of switches 310 is a member of both the first 302 and second 304 mesh domains.

Figure 4:
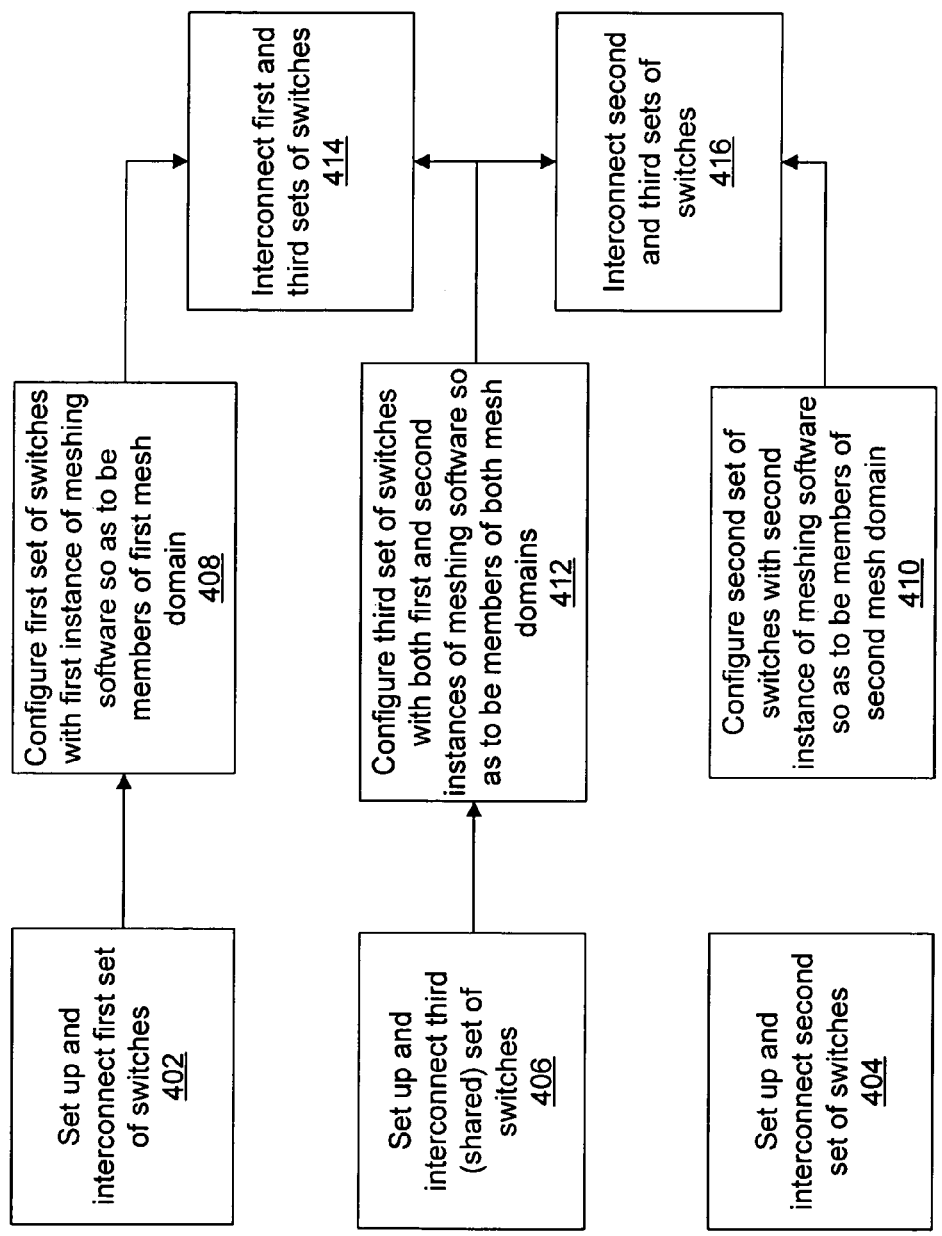
FIG. 4 is a chart depicting some steps in configuring a switching system with multiple-instance meshing in accordance with an embodiment of the invention.

FIG. 4 is a chart depicting some steps in configuring a switching system with multiple-instance meshing in accordance with an embodiment of the invention. In FIG. 4, the switching system being configured includes two overlapping mesh domains, such as the system 300 discussed above in reference to FIG. 3. The steps in FIG. 4 may be expanded for more than two mesh domains in similar fashion.

The steps include setting up and interconnecting 402 a first set of switches 306 for the first mesh domain 302, setting up and interconnecting 404 a second set of switches 308 for the second mesh domain 304, and setting up and interconnecting 406 a third set of switches 310 for the overlap between first 302 and second 304 mesh domains.

The switches in the first set 306 are configured 408 with a first instance of the meshing software so that each of these switches becomes a member of the first mesh domain 302. The switches in the second set 308 are configured 410 with a second instance of the meshing software so that each of these switches becomes a member of the second mesh domain 304. The switches in the third set 310 are configured 412 with both the first and second instances of the meshing software so that each of these switches becomes a member of both the first 302 and second 304 mesh domains.

The first and third sets of switches are interconnected 414 with at least one connection or link between a mesh port of a switch in the first set 306 and a mesh port of a switch in the third set 310, wherein the mesh ports connected together are both members of the first mesh domain 302. Similarly, the second and third sets of switches are interconnected 416 with at least one connection or link between a mesh port of a switch in the second set 308 and a mesh port of a switch in the third set 310, wherein the mesh ports connected together are both members of the second mesh domain 304.

Note that, unlike configuration of the prior system, no separate trunk interconnection between switches is needed. Note also that, in configuring the prior system, a customer simply specifies that a port is a mesh port in order for the switch to be a member of the single mesh domain. In contrast, with multiple-instance meshing, a customer first configures how many mesh domains a switch will be part of. Once that is configured, the customer configures which ports are going to be mesh ports and on which domain.

Multiple-instance meshing also allows a customer to configure a VLAN to be a member of a mesh domain. For example, per the system in FIG. 3, VLANs 3, 4, and 5 may be members of Mesh Domain 1, while VLANs 6, 7, and 8 may be members of Mesh Domain 2. This provides a mechanism for a customer desiring to virtually segment traffic on the system.

Figure 5:
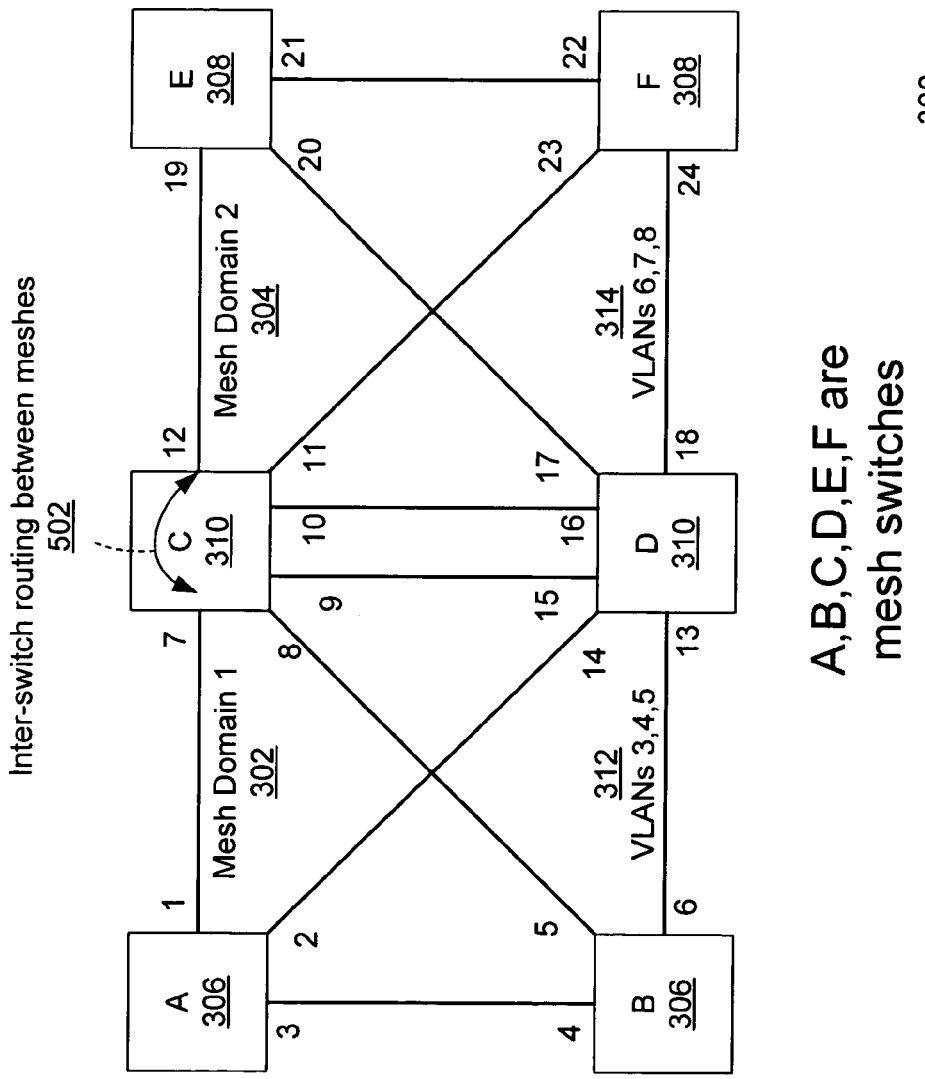
FIG. 5 is a schematic diagram showing intra-switch routing between meshes in accordance with an embodiment of the invention.

As a further value-add, a switch that is a member of multiple mesh domains may also be configured to provide intra-switch routing 502 between the different mesh domains. FIG. 5 is a schematic diagram showing a single switch with multiple-instance meshing acting as a router between two mesh domains in accordance with an embodiment of the invention. Per FIG. 5, switch C is configured to act as a router between Mesh Domain 1 and Mesh Domain 2, in addition to being an active member of both those mesh domains.

Figure 6:
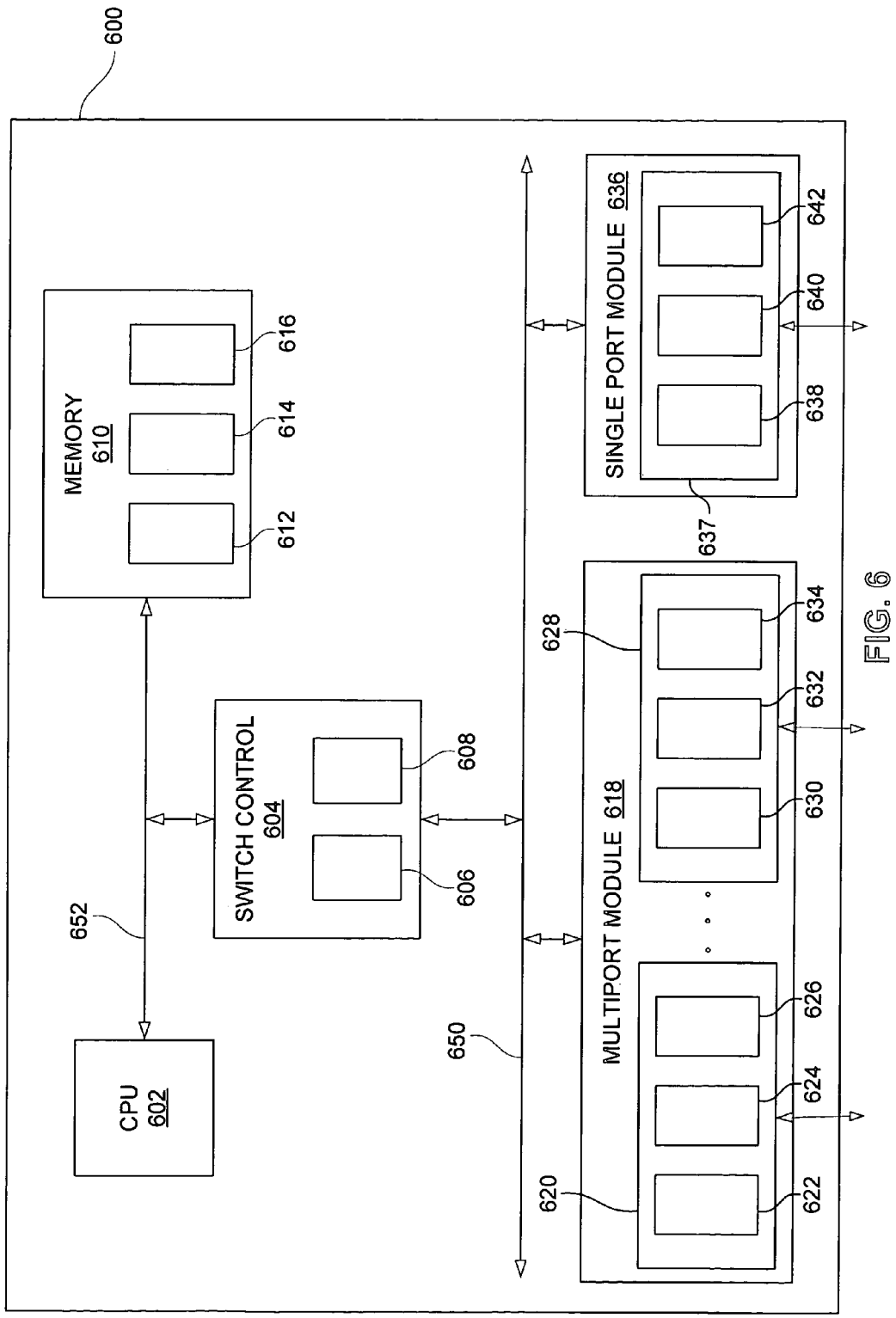
FIG. 6 is a schematic diagram of an exemplary packet switch operable in accordance with an embodiment of the invention.

FIG. 6 is a schematic diagram of an exemplary packet switch 600 operable in accordance with an embodiment of the invention. The specific configuration of packet switches used will vary depending on the specific implementation.

A central processing unit (CPU) 602 performs overall configuration and control of the switch 600 operation. The CPU 602 operates in cooperation with switch control 604, an application specific integrated circuit (ASIC) designed to assist CPU 602 in performing packet switching at high speeds required by modern networks.

The switch control 604 controls the "forwarding" of received packets to appropriate locations within the switch for further processing and/or for transmission out another switch port. Inbound and outbound high speed FIFOs (606 and 608, respectively) are included with the switch control 604 for exchanging data over switch bus 652 with port modules. In accordance with an embodiment of the invention, the switch control ASIC 604 is configured to insert, remove, and analyze a path tag within a fixed location in a packet.

Memory 610 includes a high and low priority inbound queue (612 and 614, respectively) and outbound queue 616. High priority inbound queue 612 is used to hold received switch control packets awaiting processing by CPU 602 while low priority inbound queue 614 holds other packets awaiting processing by CPU 602. Outbound queue 616 holds packets awaiting transmission to switch bus 620 via switch control 604 through its outbound FIFO 608. CPU 602, switch control 604 and memory 610 exchange information over processor bus 652 largely independent of activity on switch bus 620.

The memory 610 is also configured to include an embedded operating system. As discussed below in reference to FIGS. 7A, 7B, and 7C, the memory 610 is further configured to include one or more instances of the meshing software in accordance with an embodiment of the invention.

The ports of the switch may be embodied as plug-in modules that connect to switch bus 620. Each such module may be, for example, a multi-port module 618 having a plurality of ports in a single module or may be a single port module 636. A multi-port module provides an aggregate packet switch performance capable of handling a number of slower individual ports. For example, in one embodiment, both the single port module 636 and the multi-port module 618 may be configured to provide, for example, approximately 1 Gbit per second packet switching performance. The single port module 636 therefore can process packet switching on a single port at speeds up to 1 Gbit per second. The multi-port module 618 provides similar aggregate performance but distributes the bandwidth over, preferably, eight ports each operating at speeds, for example, of up to 100 Mbit per second.

Each port includes high speed FIFOs for exchanging data over its respective port. Specifically, each port, 620, 628, and 637, preferably includes an inbound FIFO 622, 630, and 638, respectively for receiving packets from the network medium connected to the port. Further, each port 620, 628, and 637, preferably includes a high priority outbound FIFO 624, 632, and 610, respectively, and a low priority outbound FIFO 626, 634, and 642, respectively. The low priority outbound FIFOs are used to queue data associated with transmission of normal packets while the high priority outbound FIFO is used to queue data associated with transmission of control packets. Each module (618 and 636) includes circuits (not specifically shown) to connect its port FIFOs to the switch bus 620.

As packets are received from a port, the packet data is applied to the switch bus 620 in such a manner as to permit monitoring of the packet data by switch control 604. In general, switch control 604 manages access to switch bus 620 by all port modules (i.e., 618 and 636). All port modules "listen" to packets as they are received and applied by a receiving port module to switch bus 620. If the packet is to be forwarded to another port, switch control 604 applies a trailer message to switch bus 620 following the end of the packet to identify which port should accept the received packet for forwarding to its associated network link.

Figure 7C:
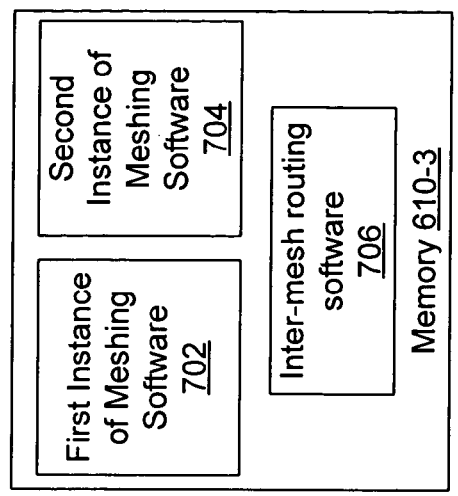
FIGS. 7A, 7B, and 7C are diagrams illustrating meshing software in memories of the first, second, and third set of switches, respectively, in accordance with an embodiment of the invention.
Figure 7B:
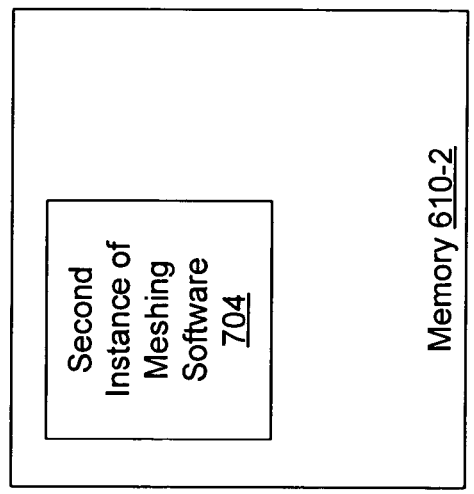
Figure 7A:
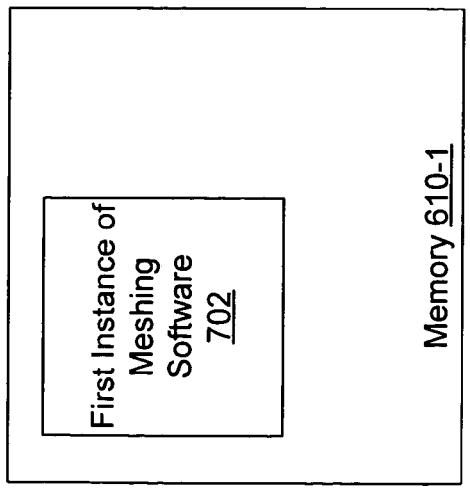

FIGS. 7A, 7B, and 7C are diagrams illustrating meshing software instances in memories 610 of the first 306, second 308, and third (overlapping) 310 set of switches, respectively, in accordance with an embodiment of the invention. The memory 610-1 of each switch in the first set 306 includes, among other contents, a first instance 702 of the meshing software that is configured so that the switch is a member of the first mesh domain 302. The memory 610-2 of each switch in the second set 308 includes, among other contents, a second instance 704 of the meshing software that is configured so that the switch is a member of the second mesh domain 304. Finally, the memory 610-3 of each switch in the third set 308 includes, among other contents, both the first instance 702 and the second instance 704 of the meshing software so that the switch is a member of both mesh domains.

In accordance with an embodiment of the invention, a mesh identifier is included in all meshing packets. The mesh identifier is used by the multi-instance mesh switches to identify which mesh instance is associated with a meshing packet. The meshing identifier advantageously assists in detecting misconfigurations. For example, if a mesh switch receives a meshing packet with an invalid mesh identifier (on that interface), then a misconfiguration would be indicated.

In accordance with an embodiment of the invention, each multi-instance mesh switch is configured with a mesh debug protocol. The mesh debug protocol periodically advertises to the rest of the mesh that this switch (on this interface) is associated with a particular mesh identifier. Such a mesh debug protocol advantageously keeps the switches up-to-date with the current multi-instance mesh topology.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A switching system, the switching system comprising:
a first set of switches configured with a first instance of meshing software such that the switches in the first set are members of a first mesh domain;
a second set of switches configured with a second instance of the meshing software such that the switches in the second set are members of a second mesh domain; and
a third set of switches configured with both the first and second instances of the meshing software such that the switches in the third set are members of both the first and second mesh domains,
wherein the switches are configured to insert a mesh identifier in a packet to identify which instance of the meshing software is associated with the packet.

2. The switching system of claim 1, further comprising a link between a mesh port of a switch in the first set and a mesh port of a switch in the third set, wherein both mesh ports are configured to be members of the first mesh domain.

3. The switching system of claim 2, further comprising a link between a mesh port of a switch in the second set and a mesh port of a switch in the third set, wherein both mesh ports are configured to be members of the second mesh domain.

4. The switching system of claim 1, wherein a switch in the third set is configured to provide routing of packets between the first and second mesh domains.

5. The switching system of claim 1, wherein the switches are further configured with a mesh debug protocol which periodically advertises the mesh identifier(s) associated with each switch to other switches.

6. A packet switch apparatus, the apparatus comprising:
multiple ports configured to receive and transmit data packets;
a switch controller coupled to the plurality of ports; and
memory coupled to the switch controller and configured to hold instructions and data for use by the controller,
wherein the memory holds multiple instances of meshing software that are executing on the apparatus, and
wherein the apparatus is configured to insert a mesh identifier in a packet to identify which instance of the meshing software is associated with the packet.

7. The packet switch apparatus of claim 6, wherein at least one port is configured to be a mesh port that is a member of a first mesh domain, and at least one port is configured to be a mesh port that is a member of a second mesh domain.

8. The packet switch apparatus of claim 7, wherein at least one port is configured to be a non-mesh port that is not a member of any mesh domain.

9. The packet switch apparatus of claim 6, wherein the memory further includes a routing module to provide intra-switch routing of packets between different mesh domains.

10. The packet switch apparatus of claim 6, wherein the apparatus is further configured with a mesh debug protocol which periodically advertises the mesh identifier(s) associated with the apparatus to other switches.

* * * * *